United States Patent
Nyikos et al.

(10) Patent No.: US 10,036,813 B2
(45) Date of Patent: Jul. 31, 2018

(54) VERIFICATION OF TRUSTWORTHINESS OF POSITION INFORMATION TRANSMITTED FROM AN AIRCRAFT VIA A COMMUNICATIONS SATELLITE

(71) Applicant: The Boeing Company, Chicago, IL (US)

(72) Inventors: Siobvan M. Nyikos, Kent, WA (US); Arun Ayyagari, Seattle, WA (US); Ted Eigle, Upland, CA (US); William R. Richards, Mercer Island, WA (US); Tracy L. Woodward, Chandler, AZ (US); Bernell R. McCormick, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 14/941,962

(22) Filed: Nov. 16, 2015

(65) Prior Publication Data
US 2017/0139049 A1   May 18, 2017

(51) Int. Cl.
*G01S 19/21* (2010.01)
*G01S 19/24* (2010.01)
(Continued)

(52) U.S. Cl.
CPC ............... *G01S 19/21* (2013.01); *G01S 5/02* (2013.01); *G01S 19/17* (2013.01); *G01S 19/24* (2013.01); *G01S 19/39* (2013.01); *G08G 5/00* (2013.01)

(58) Field of Classification Search
CPC ................................ G01S 19/21; G01S 19/24
(Continued)

(56) References Cited

U.S. PATENT DOCUMENTS 6,044,323 A   3/2000 Yee et al.
7,196,621 B2  3/2007 Kochis
(Continued)

FOREIGN PATENT DOCUMENTS

WO   WO2011048106 A1   4/2011
WO   WO2015131384 A1   9/2015

OTHER PUBLICATIONS

Extended European Search Report, dated May 8, 2017, regarding Application No. EP16197095.9, 9 pages.
(Continued)

*Primary Examiner* — Dao L Phan
(74) *Attorney, Agent, or Firm* — Yee & Associates, P.C.

(57) ABSTRACT

An apparatus and method of verifying the trustworthiness of position information from an onboard tracking system on an aircraft. An onboard tracking system message comprising onboard tracking system position information indicating a first position of the aircraft is generated by the onboard tracking system and transmitted to an off board aircraft tracking system via a communications satellite in a satellite communications system. The satellite communications system adds a header comprising transmitter position information identifying a second position for transmission of the onboard tracking system message received by the communications satellite to the onboard tracking system message to form a message. The message is received from the satellite communications system by the off board aircraft tracking system and the first position from the onboard tracking system message is compared to the second position from the header to determine whether the onboard tracking system position information is trustworthy.

20 Claims, 9 Drawing Sheets

(51) Int. Cl.
    *G01S 19/17*     (2010.01)
    *G01S 19/39*     (2010.01)
    *G01S 5/02*      (2010.01)
    *G08G 5/00*      (2006.01)

(58) Field of Classification Search
    USPC ......... 342/357.49, 357.59, 357.63, 455, 456;
                                  701/301, 533; 340/981
    See application file for complete search history.

(56)          References Cited

U.S. PATENT DOCUMENTS

| | | |
|---|---|---|
| 7,218,227 B2 | 5/2007 | Davis et al. |
| 7,898,425 B2 | 3/2011 | Nagy et al. |
| 9,031,497 B1 | 5/2015 | Hoffman et al. |
| 9,049,585 B1 | 6/2015 | Hoffman et al. |
| 2008/0191863 A1 | 8/2008 | Boling et al. |
| 2008/0258885 A1 | 10/2008 | Akhan |
| 2012/0200460 A1 | 8/2012 | Weed et al. |

OTHER PUBLICATIONS

Murphy, "Aircraft Tracking Method and Device and Method of Installation," U.S. Appl. No. 14/832,879, filed Aug. 21, 2015, 53 pages.

Murphy, "Aircraft Distress Tracking and Interface to Search and Rescue System," U.S. Appl. No. 14/832,851, filed Aug. 21, 2015, 59 pages.

Adler et al., "Controller for an Aircraft Tracker," U.S. Appl. No. 14/858,235, filed Sep. 18, 2015, 80 pages.

VERIFICATION OF TRUSTWORTHINESS OF POSITION INFORMATION TRANSMITTED FROM AN AIRCRAFT VIA A COMMUNICATIONS SATELLITE

BACKGROUND INFORMATION

1. Field

The present disclosure relates generally to identifying the position of an aircraft and reporting the position of the aircraft from the aircraft to a location off of the aircraft. More particularly, the present disclosure relates to a method and apparatus for verifying that position information identifying the position of an aircraft that is received from the aircraft is trustworthy, so that appropriate action may be taken using the position information from the aircraft.

2. Background

Aircraft may include various systems for determining the position of the aircraft and for reporting the position of the aircraft from the aircraft to a location off of the aircraft. The aircraft position reported from the aircraft may be used to take appropriate actions under various conditions.

For example, without limitation, many aircraft carry distress radio beacons. Distress radio beacons may be known as emergency beacons or by other names. For example, without limitation, many commercial passenger aircraft and other aircraft may carry a distress radio beacon known as an emergency locator transmitter, or ELT.

An emergency locator transmitter on an aircraft is intended to aid in locating the aircraft after a crash. An emergency locator transmitter on an aircraft may be manually or automatically activated to send out a distress signal when the aircraft is in distress. For example, without limitation, an emergency locator transmitter may be activated to transmit a distress signal automatically upon immersion in water or when another condition indicating that the aircraft is in distress is detected.

A search and rescue system may detect a distress signal generated by an emergency locator transmitter or other distress radio beacon on an aircraft and respond in an appropriate manner. For example, COSPAS-SARSAT is an international humanitarian search and rescue system for locating and responding to aircraft, ships, or individuals in distress. The COSPAS-SARSAT system includes a network of satellites, ground stations, mission control centers, and rescue coordination centers.

COSPAS-SARSAT uses satellites to detect distress signal transmissions from emergency locator transmitters on aircraft. The signal from an emergency locator transmitter on an aircraft is received by a satellite in the COSPAS-SARSAT system and relayed to the nearest available ground station. The ground station, called a Local User Terminal, processes the signal and determines the position from which it originated. The primary means for determining the position of the transmission from the emergency locator transmitter is using satellite orbit information and signal Doppler measurements. In some cases, an emergency locator transmitter may be configured to determine its location using a satellite navigation system receiver that is either integrated into the emergency locator transmitter or fed by a satellite navigation system receiver that is not part of the emergency locator transmitter.

Information identifying the position of the emergency locator transmitter is transmitted from the ground station to a mission control center where it is joined with identification data and other information associated with the emergency locator transmitter. The mission control center then transmits an alert message to an appropriate rescue coordination center based on the determined geographic location of the detected transmission from the emergency locator transmitter and other available information.

Current emergency locator transmitters may have several limitations. For example, position information provided by current emergency locator transmitters may not be sufficiently accurate or provided in a sufficiently reliable manner to locate an aircraft in distress effectively. The majority of currently fielded emergency locator transmitters do not provide position information directly. The location of the emergency locator transmitter is determined by radio frequency direction finding or multilateration through satellite links. This process may take an undesirably long time and may not be sufficiently reliable.

Accordingly, it would be beneficial to have a method and apparatus that take into account one or more of the issues discussed above, as well as possible other issues.

SUMMARY

The illustrative embodiments of the present disclosure provide a method of verifying trustworthiness of position information transmitted from an aircraft. A message received from a satellite communications system comprises an onboard tracking system message from an onboard tracking system on the aircraft and a header added to the onboard tracking system message by the satellite communications system. The onboard tracking system message comprises onboard tracking system position information indicating a first position for the aircraft determined by the onboard tracking system. The header comprises transmitter position information identifying a second position for transmission of the onboard tracking system message received by a communications satellite in the satellite communications system. The first position from the onboard tracking system message is compared to the second position from the header to determine whether the onboard tracking system position information is trustworthy, thereby enabling taking an action using the onboard tracking system position information with a reduced concern that the onboard tracking system position information is not trustworthy. An appropriate action may be taken using the onboard tracking system position information from the onboard tracking system message in response to a determination that the onboard tracking system position information is trustworthy.

The illustrative embodiments of the present disclosure also provide an apparatus comprising a receiver configured to receive a message from a satellite communications system and a comparator. The message comprises an onboard tracking system message from an onboard tracking system on an aircraft and a header added to the onboard tracking system message by the satellite communications system. The onboard tracking system message comprises onboard tracking system position information indicating a first position for the aircraft determined by the onboard tracking system. The header comprises transmitter position information identifying a second position for a transmission of the onboard tracking system message received by a communications satellite in the satellite communications system. The comparator is configured to compare the first position from the onboard tracking system message to the second position from the header to determine whether the onboard tracking system position information is trustworthy, thereby enabling taking an action using the onboard tracking system position information with a reduced concern that the onboard tracking system position information is not trustworthy.

The illustrative embodiments of the present disclosure also provide a method of verifying trustworthiness of position information transmitted from an aircraft. A message received from a satellite communications system comprises an onboard tracking system message from an onboard tracking system on the aircraft and a header added to the onboard tracking system message by the satellite communications system. The onboard tracking system message comprises onboard tracking system position information indicating a first position for the aircraft and an indication of accuracy of the first position determined by the onboard tracking system. The header comprises transmitter position information identifying a second position for transmission of the onboard tracking system message received by a communications satellite in the satellite communications system and accuracy information identifying an accuracy of the second information. The accuracy of the first position from the onboard tracking system message is compared to the accuracy of the second position from the header to determine whether the onboard tracking system position information is trustworthy, thereby enabling taking an action using the onboard tracking system position information with a reduced concern that the onboard tracking system position information is not trustworthy. An appropriate action may be taken using the onboard tracking system position information from the onboard tracking system message in response to a determination that the onboard tracking system position information is trustworthy.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Figure 1:
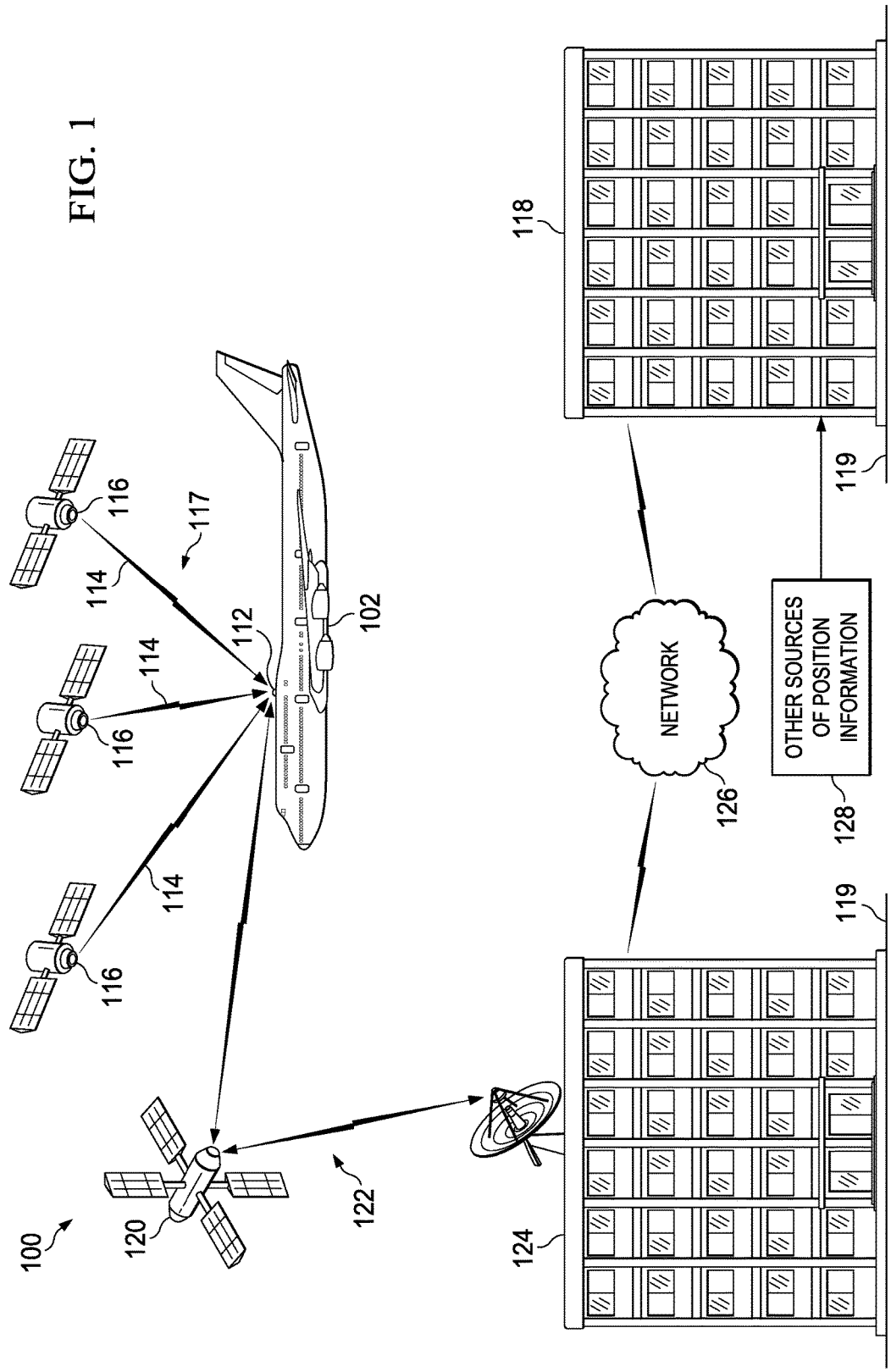
FIG. 1 is an illustration of an aircraft operating environment in accordance with an illustrative embodiment.

Different illustrative embodiments recognize and take into account a number of different considerations. "A number," as used herein with reference to items, means one or more items. For example, "a number of different considerations" are one or more different considerations.

The different illustrative embodiments recognize and take into account that it may be desirable to provide aircraft position information from an aircraft at a desired rate throughout a flight, not just in response to a determination that the aircraft is in distress. Such position information from the aircraft may be used to support aircraft tracking and location in support of search and rescue operations and for other appropriate purposes.

The different illustrative embodiments recognize and take into account that a position of an aircraft may be determined throughout a flight by an onboard tracking system on the aircraft. For example, without limitation, the onboard tracking system may determine the position of the aircraft accurately using a satellite navigation system or in another appropriate manner.

The different illustrative embodiments recognize and take into account that position information generated by an onboard tracking system may be sent from the aircraft to an aircraft tracking system located almost anywhere in the world via a satellite communications system. The aircraft tracking system may use the position information received from the onboard tracking system on the aircraft to support search and rescue operations when the aircraft is determined to be in distress, or for other appropriate purposes.

The different illustrative embodiments also recognize and take into account that, although the risk is low, a transmission of position information from an aircraft to an aircraft tracking system via a communications satellite may be vulnerable to spoofing. For example, without limitation, false or inaccurate position information that appears to be from an authentic onboard tracking system on an aircraft may be transmitted from an unauthorized transmitter. Initiating or performing a search and rescue operation using such false or inaccurate information, for example, would waste valuable resources and may limit the ability of a search and rescue system to respond to a legitimate emergency. Therefore, the illustrative embodiments recognize and take into account that it may be desirable to verify that position information received from an aircraft is trustworthy before using such information to conduct a search and rescue operation or perform another appropriate action.

Illustrative embodiments provide a system and method for verifying that position information received from an onboard tracking system on an aircraft is trustworthy before using the position information. In accordance with an illustrative embodiment, an onboard tracking system on an aircraft determines a position of the aircraft and sends the position information to an aircraft tracking system via a communications satellite in a satellite communications system. The satellite communications system may determine the position of the transmission from the aircraft and include this transmitter position information in a header that is attached to the onboard tracking system message to form a message that is sent from the satellite communications system to the aircraft tracking system. The position of the aircraft from the onboard tracking system message from the aircraft may be compared to the position of the transmission from the header to determine whether the position information from the onboard tracking system is trustworthy. For example, without limitation, the position information from the onboard tracking system may be determined to be trustworthy when the position from the onboard tracking system is within a threshold distance from the position in the header added by the satellite communications system. Other position information for the aircraft from other sources also may be compared to the position of the aircraft from the onboard tracking system to further verify that the position information from the onboard tracking system is trustworthy.

Turning to FIG. 1, an illustration of an aircraft operating environment is depicted in accordance with an illustrative embodiment. Aircraft operating environment 100 may include any appropriate environment in which aircraft 102 may be operated in any appropriate manner.

Aircraft 102 may be any appropriate type of aircraft that may be configured to perform any appropriate operation or mission in aircraft operating environment 100. For example, without limitation, aircraft 102 may be a commercial passenger aircraft or any other appropriate type of aircraft.

In accordance with an illustrative embodiment, aircraft 102 may include onboard tracking system 112. For example, without limitation, onboard tracking system 112 may comprise a tracking device attached to the skin of aircraft 102 on the outside of aircraft 102. Alternatively, or in addition, onboard tracking system 112 may be located partially or entirely inside of aircraft 102.

Onboard tracking system 112 may be configured to determine the position of aircraft 102 in any appropriate manner. For example, without limitation, onboard tracking system 112 may be configured to identify the position of aircraft 102 using navigation signals 114 received from a number of navigation system satellites 116 in a known manner. Onboard tracking system 112 may use navigation signals 114 received from more than three navigation system satellites 116 to determine the position of aircraft 102. For example, without limitation, navigation system satellites 116 may include satellites in satellite navigation system 117 such as the Global Positioning System, or GPS, the Global Navigation Satellite System, or GLONASS, other appropriate satellite navigation systems, or various combinations of satellite navigation systems that may be used by onboard tracking system 112 to determine the position of aircraft 102. Alternatively, or in addition, onboard tracking system 112 may be configured to determine the position of aircraft 102 using onboard inertial reference units, other navigation and guidance systems onboard aircraft 102, or in any other appropriate manner.

In accordance with an illustrative embodiment, onboard tracking system 112 is configured to generate and send an onboard tracking system message including position information identifying the position of aircraft 102 to off board aircraft tracking system 118. For example, without limitation, off board aircraft tracking system 118 may be located on ground 119. Off board aircraft tracking system 118 may comprise a global aircraft tracking system. Off board aircraft tracking system 118 may be operated by any appropriate entity. For example, without limitation, when aircraft 102 is a commercial passenger aircraft, off board aircraft tracking system 118 may be operated by an airline. Alternatively, off board aircraft tracking system 118 may be operated by a third party for a number of airlines or other operators of aircraft 102.

In accordance with an illustrative embodiment, onboard tracking system 112 on aircraft 102 may be configured to send the onboard tracking system message to off board aircraft tracking system 118 via communications satellite 120 and satellite communications system 122. Satellite communications system 122 may comprise communications satellite 120 and ground facilities 124. Communications satellite 120 may comprise any appropriate communications satellite or a plurality of communications satellites for establishing a communications link between onboard tracking system 112 on aircraft 102 and ground facilities 124. For example, without limitation, communications satellite 120 may be a communications satellite in low Earth orbit. A satellite in low Earth orbit is in orbit around the Earth with an altitude between approximately 160 kilometers and 2,000 kilometers. For example, without limitation, communications satellite 120 may be an Iridium communications satellite, and satellite communications system 122 may comprise the Iridium satellite communications system operated by Iridium Communications.

Ground facilities 124 for satellite communications system 122 may be configured to determine the position of a transmission from onboard tracking system 112 on aircraft 102 using various modalities, such as satellite constellation dynamics and coverage, radio frequency signal characteristics, other appropriate methods, or various combinations of methods. This estimate of the position of the transmission may be included in a header that is combined with the onboard tracking system message from aircraft 102 to form a message that is sent from the satellite communications system 122 to off board aircraft tracking system 118 via network 126. Network 126 may comprise any appropriate computer network. For example, without limitation, network 126 may comprise the Internet.

Off board aircraft tracking system 118 may be configured to compare the position of aircraft 102 from onboard tracking system 112 on aircraft 102 to the position of the transmission provided by satellite communications system 122 in the header of the message to determine whether the position information from onboard tracking system 112 is trustworthy. For example, without limitation, the position information from onboard tracking system 112 may be determined to be trustworthy when the position from onboard tracking system 112 is within a threshold distance from the position in the header added by satellite communications system 122. Other position information for aircraft 102 from other sources of position information 128 also may be compared to the position of aircraft 102 from onboard tracking system 112 to further verify that the position information from onboard tracking system 112 is trustworthy.

Figure 2:
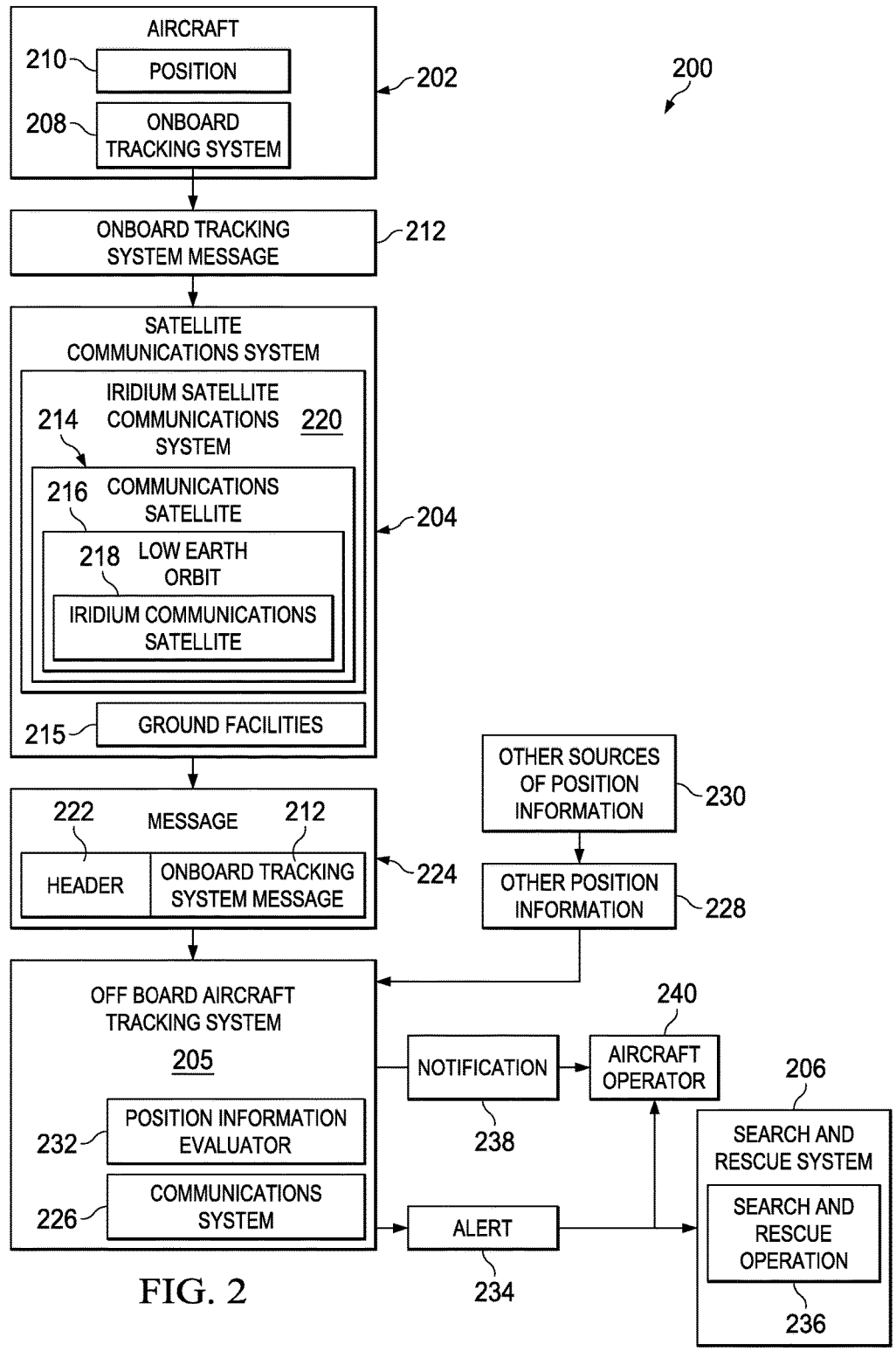
FIG. 2 is an illustration of a block diagram of an aircraft operating environment in accordance with an illustrative embodiment.

Turning to FIG. 2, an illustration of a block diagram of an aircraft operating environment is depicted in accordance with an illustrative embodiment. Aircraft operating environment 200 may be an example of one implementation of aircraft operating environment 100 in FIG. 1. Aircraft operating environment 200 may comprise aircraft 202, satellite communications system 204, off board aircraft tracking system 205, and search and rescue system 206.

Aircraft 202 may be any appropriate type of aircraft that may be configured to perform any appropriate operation or mission in aircraft operating environment 200. For example, without limitation, aircraft 202 may be a commercial passenger aircraft, a cargo aircraft, a military aircraft, or any other appropriate type of aircraft. Aircraft 202 may be a fixed wing aircraft, a rotary wing aircraft, or a lighter-than-air aircraft. Aircraft 202 may be a manned aircraft or an unmanned aircraft.

Aircraft 202 includes onboard tracking system 208. Onboard tracking system 208 may be configured to determine position 210 of aircraft 202 and send onboard tracking system message 212 to off board aircraft tracking system 205 via satellite communications system 204. Satellite communications system 204 may include communications satellite 214 and ground facilities 215. For example, without limitation, communications satellite 214 may be a communications satellite in low Earth orbit 216. For example, without limitation, communications satellite 214 may be Iridium communications satellite 218. For example, without limitation, satellite communications system 204 may comprise Iridium satellite communications system 220.

Satellite communications system 204 may be configured to add header 222 to onboard tracking system message 212 received from aircraft 202 to form message 224. Message 224 may be delivered from satellite communications system 204 to off board aircraft tracking system 205 via the Internet, another appropriate computer network, or in another appropriate manner.

Off board aircraft tracking system 205 may include communications system 226 for receiving message 224 from satellite communications system 204. Communications system 226 also may be configured to receive other position information 228 for aircraft 202 from other sources of position information 230.

Off board aircraft tracking system 205 also may include position information evaluator 232. Position information evaluator 232 may be configured to compare position information provided from onboard tracking system 208 on aircraft 202 in onboard tracking system message 212 with position information provided by satellite communications system 204 in header 222 to determine whether the position information provided by onboard tracking system 208 is trustworthy.

Off board aircraft tracking system 205 may be configured to send alert 234 to search and rescue system 206 to perform search and rescue operation 236, or take another appropriate action, using the position information provided by onboard tracking system 208 in response to a determination that the position information provided by onboard tracking system 208 is trustworthy. For example, without limitation, alert 234 may indicate that aircraft 202 is in distress and may include position information from onboard tracking system message 212 identifying the position of aircraft 202.

Off board aircraft tracking system 205 also may send alert 234 or notification 238 to aircraft operator 240. Notification 238 may be sent to aircraft operator 240 or another appropriate entity to inform aircraft operator 240 or the other appropriate entity when position information from onboard tracking system 208 is determined to be not trustworthy. Aircraft operator 240 may be any appropriate operator of aircraft 202. For example, without limitation, when aircraft 202 is a commercial passenger aircraft, aircraft operator 240 may be an airline.

Figure 3:
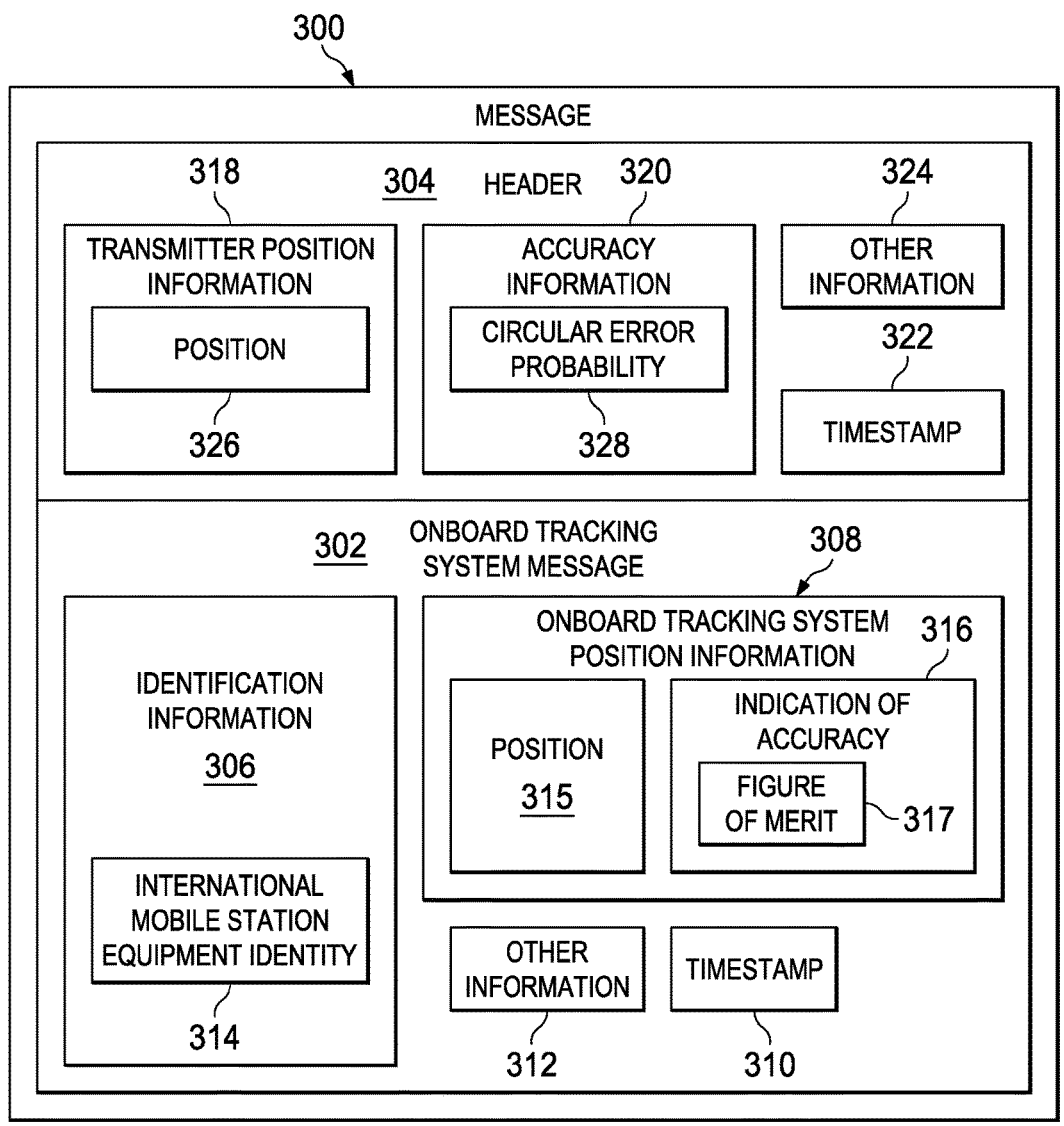
FIG. 3 is an illustration of a block diagram of a message in accordance with an illustrative embodiment.

Turning to FIG. 3, an illustration of a block diagram of a message is depicted in accordance with an illustrative embodiment. Message 300 may be an example of one implementation of message 224 in FIG. 2.

Message 300 comprises onboard tracking system message 302 and header 304. Onboard tracking system message 302 is from a tracking system on an aircraft. Onboard tracking system message 302 may comprise identification information 306, onboard tracking system position information 308, timestamp 310, and other information 312. For example, without limitation, identification information 306 may comprise international mobile station equipment identity 314. Onboard tracking system position information 308 identifies position 315 of an aircraft as determined by an onboard tracking system on the aircraft. Onboard tracking system position information 308 may include indication of accuracy 316 of position 315 of an aircraft, as determined by an onboard tracking system on the aircraft. For example, without limitation, indication of accuracy 316 may comprise figure of merit 317.

Header 304 is added to onboard tracking system message 302 by a satellite communications system to form message 300. Header 304 may include transmitter position information 318, accuracy information 320, timestamp 322, and other information 324. Transmitter position information 318 may identify position 326 of the transmission of onboard tracking system message 302 as determined by the satellite communications system. Accuracy information 320 may identify the accuracy of position 326 identified in transmitter position information 318. For example, without limitation, accuracy information 320 may comprise circular error probability 328.

Figure 4:
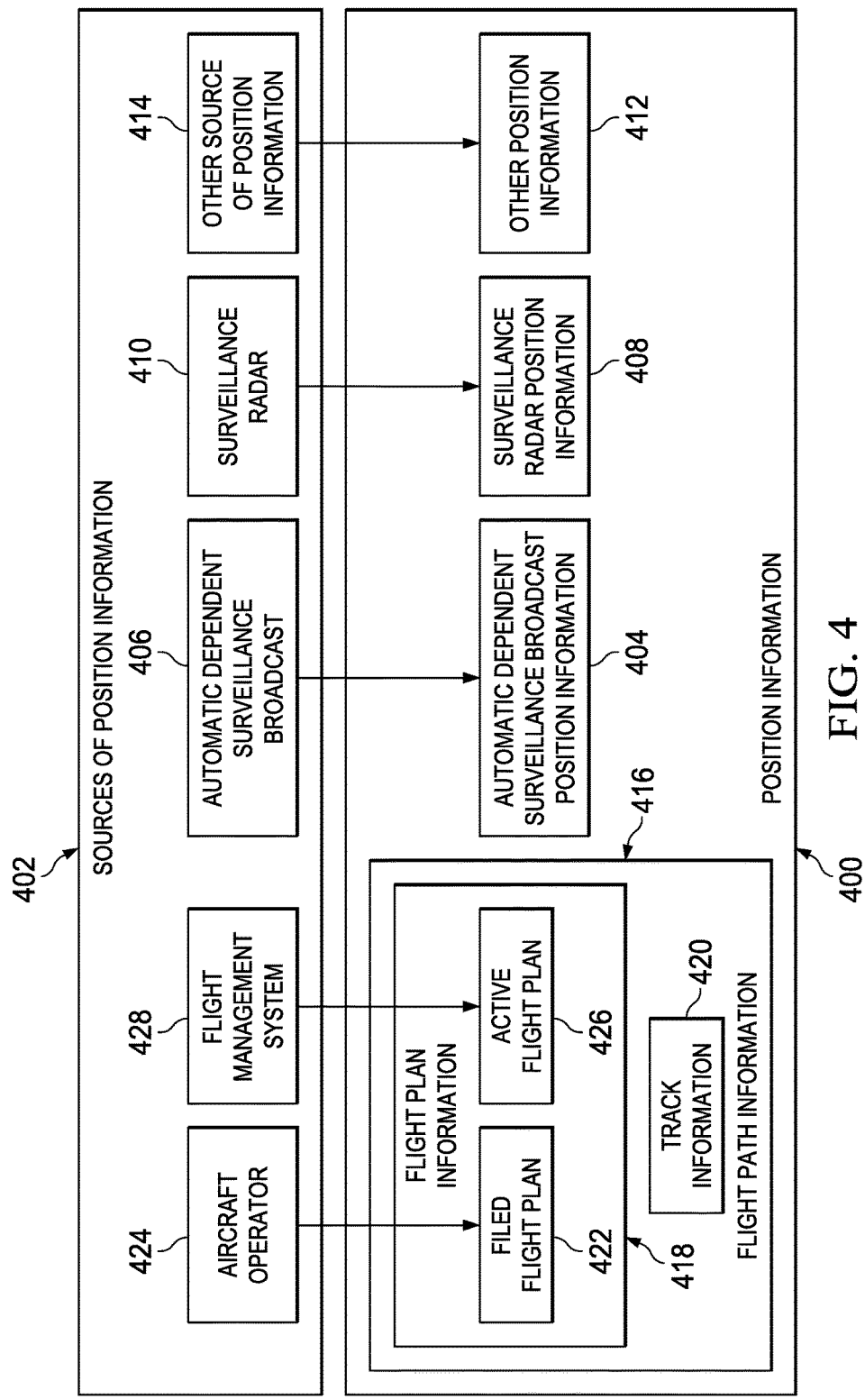
FIG. 4 is an illustration of a block diagram of position information from sources of position information in accordance with an illustrative embodiments.

Turning to FIG. 4, an illustration of a block diagram of position information from sources of position information is depicted in accordance with an illustrative embodiment. Position information 400 from sources of position information 402 may be examples of implementations of other position information 228 from other sources of position information 230 in FIG. 2. For example, without limitation, position information 400 may include automatic dependent surveillance broadcast position information 404 from automatic dependent surveillance broadcast 406, surveillance radar position information 408 from surveillance radar 410, and other position information 412 from other source of position information 414.

Position information 400 also may include flight path information 416. Flight path information 416 may include flight plan information 418 and track information 420. Flight plan information 418 may include filed flight plan 422 available from aircraft operator 424 and active flight plan 426 available from flight management system 428 on an aircraft. Track information 420 may include a plurality of previous positions of the aircraft from various sources.

Figure 5:
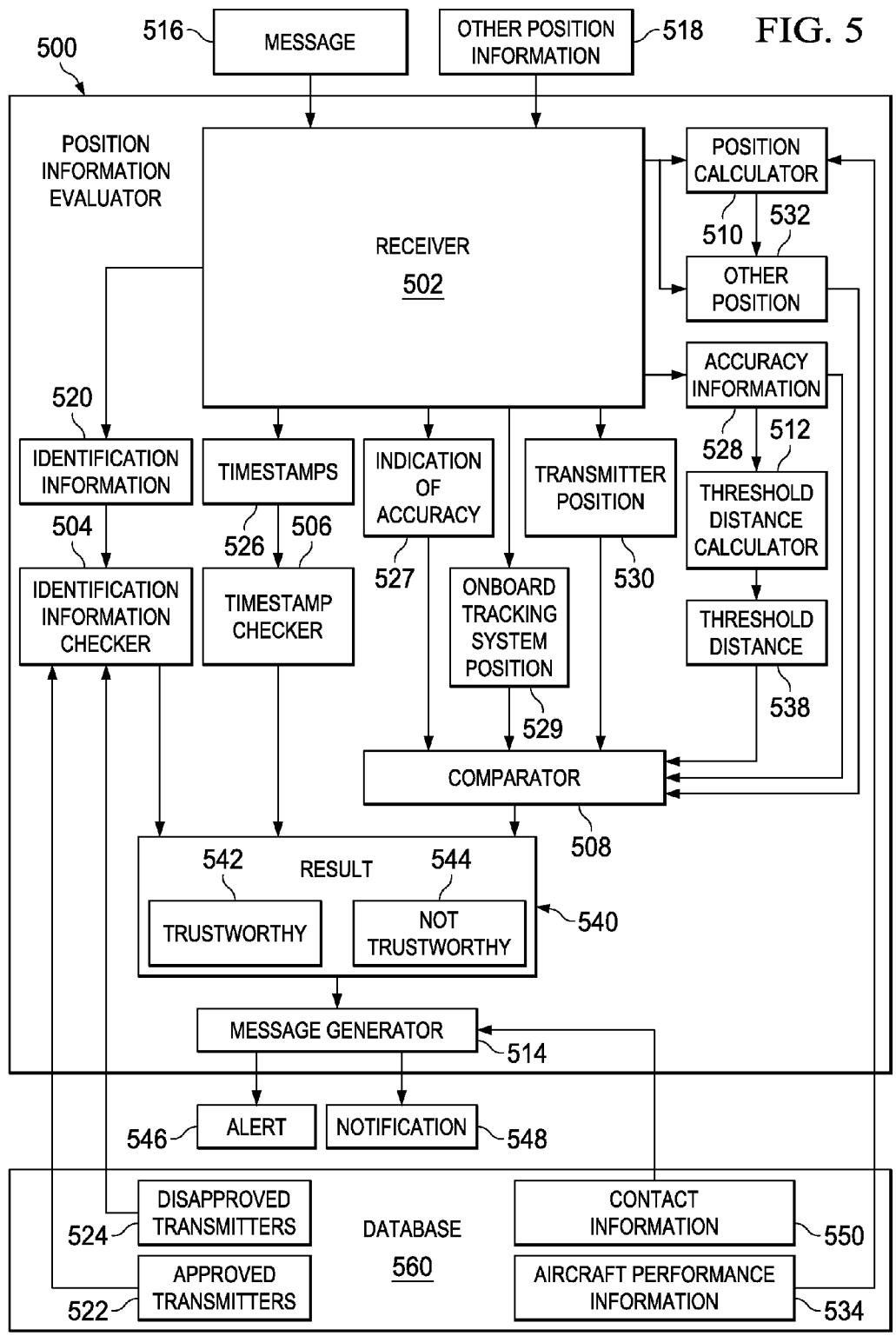
FIG. 5 is an illustration of a block diagram of a position information evaluator in accordance with an illustrative embodiment.

Turning to FIG. 5, an illustration of a block diagram of a position information evaluator is depicted in accordance with an illustrative embodiment. Position information evaluator 500 may be an example of one implementation of position information evaluator 232 in FIG. 2. Position information evaluator 500 may comprise receiver 502, identification information checker 504, timestamp checker 506, comparator 508, position calculator 510, threshold distance calculator 512, and message generator 514.

Receiver 502 may be configured to receive message 516 from a satellite communications system and other position information 518 from various sources of other position information 518. Receiver 502 also may be configured to send information in message 516 and other position information 518 to other parts of position information evaluator 500 for processing, as appropriate.

Receiver 502 may send identification information 520 from message 516 to identification information checker 504. Identification information 520 is from an onboard tracking system message portion of message 516 and identifies the source of the onboard tracking system message. Identification information checker 504 is configured to determine whether identification information 520 indicates that the source of the onboard tracking system message in message 516 is on a list of approved transmitters 522 or disapproved transmitters 524. Approved transmitters 522 are sources of onboard tracking system messages that are believed to be trustworthy. Disapproved transmitters 524 are sources of onboard tracking system messages that are known to be not trustworthy.

Receiver 502 sends timestamps 526 from an onboard tracking system message portion of message 516 and a header portion of message 516 to timestamp checker 506. Timestamp checker 506 is configured to determine whether timestamps 526 from the onboard tracking system message portion of message 516 and from the header portion of message 516 are within a threshold period of time from each other.

Receiver 502 may send indication of accuracy 527 from an onboard tracking system portion of message 516 and accuracy information 528 from the header portion of message 516 to comparator 508. Comparator 508 may compare indication of accuracy 527 to accuracy information 528.

Receiver 502 also sends onboard tracking system position 529 from an onboard tracking system message portion of message 516 and transmitter position 530 from a header portion of message 516 to comparator 508. Onboard tracking system position 529 may be referred to as a first position. Transmitter position 530 may be referred to as a second position.

Receiver 502 also may send other position 532 from other position information 518 to comparator 508. Alternatively, receiver 502 may send other position information 518 that comprises flight path information for an aircraft to position calculator 510. Position calculator 510 may be configured to calculate other position 532 from flight path information for an aircraft using aircraft performance information 534. In any case, other position 532 may be referred to as a third position.

Receiver 502 also may send accuracy information 528 from a header portion of message 516, from other position information 518, or both, to threshold distance calculator 512. Threshold distance calculator 512 may be configured to determine threshold distance 538 from accuracy information 536 in any appropriate manner. Alternatively, threshold distance 538 may be a fixed value or user selectable.

Comparator 508 may be configured to determine whether onboard tracking system position 529 is within threshold distance 538 from transmitter position 530. Comparator 508 also may be configured to determine whether onboard tracking system position 529 is within threshold distance 538 from other position 532.

When identification information checker 504 determines that identification information indicates a transmitter in approved transmitters 522 or a transmitter that is not in disapproved transmitters 524, timestamp checker 506 indicates that timestamps 526 from the onboard tracking system message and header portions of message 516 are within a threshold period of time from each other, and comparator 508 determines that onboard tracking system position 529 and transmitter position 530 are within threshold distance 538 from each other and onboard tracking system position 529 and other position 532 are within threshold distance 538 from each other, than result 540 is that onboard tracking system position 529 is trustworthy 542. Otherwise, result 540 is that onboard tracking system position 529 is not trustworthy 544.

For example, without limitation, when result 540 is that onboard tracking system message is trustworthy 542, message generator 514 may send alert 546, including onboard tracking system position 529, to a search and rescue system to conduct a search and rescue operation using onboard tracking system position 529. For example, without limitation, when result 540 is that onboard tracking system message is not trustworthy 544, message generator 514 may send notification 548 to an operator of the aircraft or another appropriate entity. Contact information 550 stored in database 560 may identify the appropriate destinations for alert 546 and notification 548.

Database 560 may include any appropriate number of databases. Database 560 may be provided as part of position information evaluator 500 or separate from but accessible by position information evaluator 500.

The illustrations of FIGS. 2-5 are not meant to imply physical or architectural limitations to the manner in which different illustrative embodiments may be implemented. Other components in addition to, in place of, or in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 6:
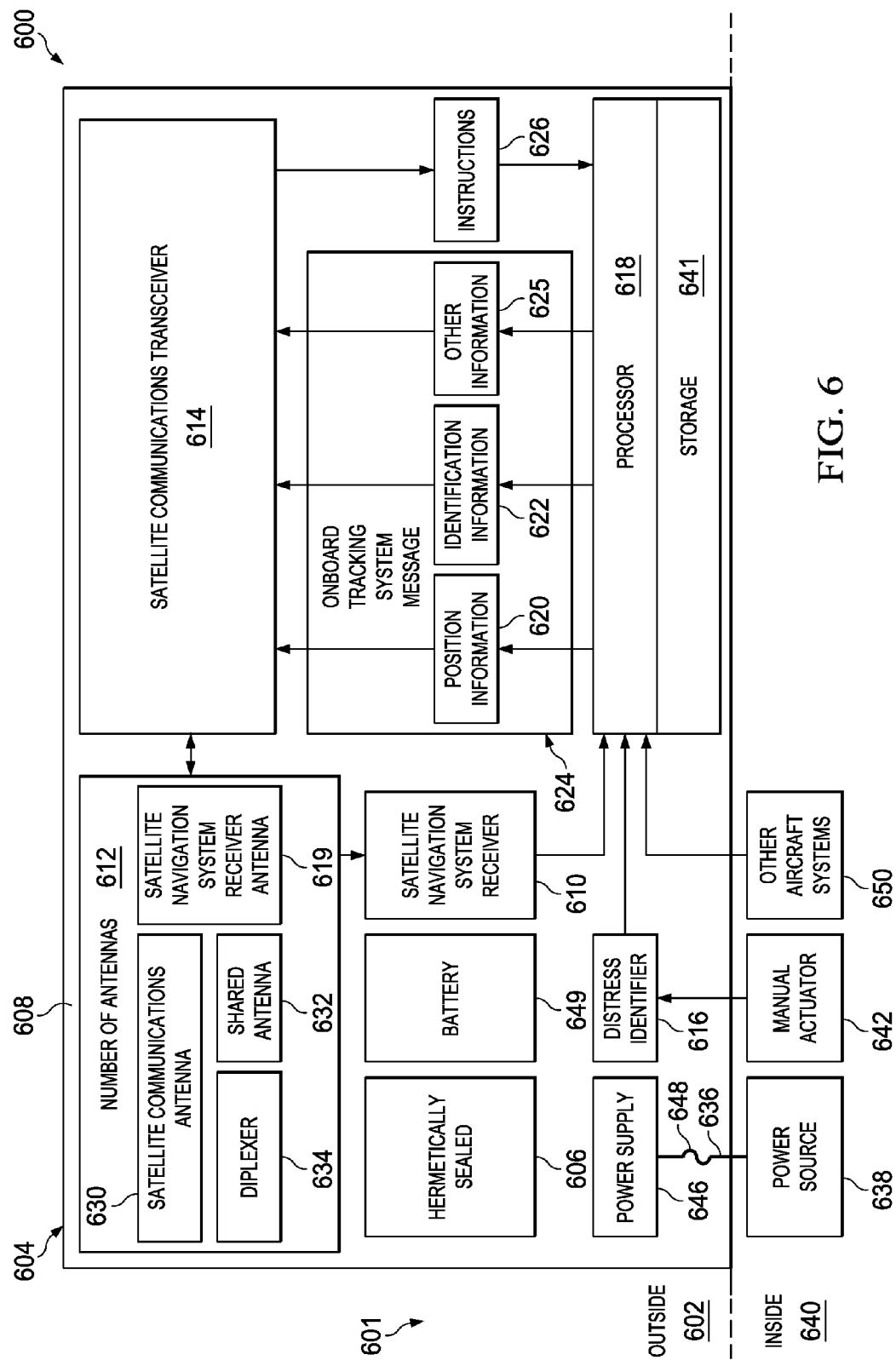
FIG. 6 is an illustration of a block diagram of a tracking device in accordance with an illustrative embodiment.

Turning to FIG. 6, an illustration of a block diagram of a tracking device is depicted in accordance with an illustrative embodiment. Tracking device 600 may be an example of one implementation of onboard tracking system 112 on aircraft 102 in FIG. 1 or onboard tracking system 208 on aircraft 202 in FIG. 2.

For example, without limitation, tracking device 600 may be attached to aircraft 601 on outside 602 of aircraft 601. Alternatively, portions of tracking device 600 may be implemented inside 640 of aircraft 601.

Tracking device 600 may comprise various electronics contained within housing 604. Housing 604 may be made in any appropriate manner of any appropriate material such that the electronics contained inside housing 604 are protected to maintain proper operation of tracking device 600 when tracking device 600 is attached to aircraft 601 on outside 602 of aircraft 601. For example, without limitation, the electronics may be hermetically sealed 606 within interior 608 of housing 604. The electronics may be hermetically sealed 606 within interior 608 of housing 604 using any appropriate materials and structures to provide an airtight seal between interior 608 of housing 604 and outside 602 of aircraft 601 when tracking device 600 is attached to aircraft 601 on outside 602 of aircraft 601. Electronics for tracking device 600 may include satellite navigation system receiver 610, number of antennas 612, satellite communications transceiver 614, distress identifier 616, and processor 618.

Satellite navigation system receiver 610 may be configured to receive navigation signals from satellites in a satellite navigation system via number of antennas 612. For example, without limitation, satellite navigation system receiver 610 may be configured to use satellite navigation system receiver antenna 619 in number of antennas 612 to receive the navigation signals. For example, without limitation, satellite navigation system receiver 610 may be configured to receive navigation signals from satellites in a global navigation satellite system such as the Global Positioning System (GPS), the Global Navigation Satellite System (GLONASS), another appropriate satellite navigations system, or from various combinations of satellite navigation systems. In accordance with an illustrative embodiment, the navigation signals received by satellite navigation system receiver 610 may be used to determine the position of aircraft 601.

Satellite communications transceiver 614 may be configured to send and receive information via a satellite communications system. For example, without limitation, satellite communications transceiver 614 may be configured to send and receive information via communications satellites in low Earth orbit, such as satellites in the Iridium network, other appropriate communications satellites, or various communications satellites from various combinations of satellite communications systems.

In accordance with an illustrative embodiment, satellite communications transceiver 614 may be used to send onboard tracking system message 624 to an aircraft tracking system via a satellite communications system. Onboard tracking system message 624 may include position information 620 identifying the position determined using the navigation signals received by satellite navigation system receiver 610. Onboard tracking system message 624 also may include identification information 622 and may be augmented by other information 625, such as time stamps and other aircraft navigation or aircraft state data. For example, without limitation, other information 625 may comprise an alert indicating that aircraft 601 is in distress.

Satellite communications transceiver 614 also may be configured to receive instructions 626 via a satellite. For example, without limitations, instructions 626 may include instructions for controlling operation of the electronics for tracking device 600.

Satellite communications transceiver 614 may use satellite communications antenna 630 in number of antennas 612 to send and receive communications from a communications satellite. Alternatively, satellite communications transceiver 614 and satellite navigation system receiver 610 may share the use of shared antenna 632 in number of antennas 612. In this case, diplexer 634 or another appropriate device may be used for separating and directing the appropriate signals from shared antenna 632 to satellite navigation system receiver 610 and satellite communications transceiver 614, and for directing any signals from satellite communications transceiver 614 to shared antenna 632.

Distress identifier 616 may be configured to identify when aircraft 601 is in distress. The functions performed by distress identifier 616 may be implemented in hardware or in software running on hardware. For example, without limitation, the functions performed by distress identifier 616 may be implemented, in whole or in part, in software running on processor 618. Alternatively, the functions performed by distress identifier 616 may be implemented entirely separately from processor 618.

Distress may include any undesired condition of aircraft 601. Distress identifier 616 may be configured to identify when aircraft 601 is in distress automatically in any appropriate manner. For example, without limitation, distress identifier 616 may determine that aircraft 601 is in distress when power for operation of electronics for tracking device 600 that is provided on power line 636 from power source 638 on inside 640 of aircraft 601 is interrupted.

In some distinct embodiments, a list or a matrix of indicators that aircraft 601 is in distress, or factors associated with aircraft 601 in distress, may be stored in storage 641 and used by distress identifier 616 to automatically determine that aircraft 601 is in distress. Examples of indicators that aircraft 601 is in distress may include abnormal position changes, abnormal deviations from flight plans, and abnormal commanded changes to the configuration of aircraft 601 that may put the aircraft in harm.

Alternatively, or in addition, distress identifier 616 may be configured to identify when aircraft 601 is in distress in response to the operation of manual actuator 642 by a human operator. Manual actuator 642 may comprise any appropriate actuation or signaling device that may be operated manually by a human operator inside 640 aircraft 601. For example, without limitation, distress identifier 616 may determine that aircraft 601 is in distress in response to manual activation of a switch or other appropriate manual actuator 642 by a human operator inside 640 aircraft 601. In this case, the switch or other appropriate manual actuator 642 may be connected to provide an appropriate signal to indicate distress to distress identifier 616 either by a wire or wirelessly in any appropriate manner.

Preferably, no interface or other capability is provided for a human operator inside 640 aircraft 601 to inhibit or cancel any such indication of distress that is provided to or determined by distress identifier 616. Limiting interfaces for controlling operation of tracking device 600 from inside 640 aircraft 601 in this manner may reduce or eliminate accidental or intentional tampering with the desirable operation of tracking device 600.

Distress identifier 616 may provide an appropriate indication to processor 618 in response to automatic or manual identification of distress by distress identifier 616. An indication that aircraft 601 is in distress may be provided from distress identifier 616 to processor 618 in any appropriate manner and form.

Processor 618 may be configured to control the operation of tracking device 600, including satellite navigation system receiver 610 and satellite communications transceiver 614. For example, processor 618 may be configured to use satellite navigation system receiver 610 to determine the position of aircraft 601 and to generate position information 620 identifying the position of aircraft 601 as identified using satellite navigation system receiver 610. Processor 618 may be configured to use satellite communications transceiver 614 to send position information 620 to a receiver station via a satellite.

Processor 618 may be configured to generate and send position information 620 automatically at any appropriate rate while aircraft 601 is in flight. For example, without limitation, the rate at which position information 620 is generated and sent from tracking device 600 may be defined by fixed intervals. Alternatively, processor 618 may be configured to change the rate for generating and sending position information 620 based on various conditions. For example, processor 618 may be configured to change the rate for generating and sending position information 620 based on the geographic location of aircraft 601. For example, without limitation, processor 618 may be configured to send updates for position information 620 more frequently when aircraft 601 is in flight over the ocean or in another remote location. Processor 618 may be configured to send position information updates less frequently when aircraft 601 is in flight in a location where aircraft 601 may be in sight of an air traffic control radar system or in another less remote location. Processor 618 also may be configured to generate and send position information 620 more frequently when it is determined that aircraft 601 is in distress.

Processor 618 also may be configured to generate and send an alert when it is determined that aircraft 601 is in distress. For example, the alert may be generated and sent by processor 618 to a receiving station via a satellite along with, or in addition to, position information 620 transmitted using satellite communications transceiver 614. For example, without limitation, the alert may include or be associated with position information 620 identifying the position of aircraft 601 when the distress started. For example, without limitation, the alert may include information identifying various characteristics of the distress, such as the condition or event that triggered the indication of distress or any other appropriate information or various combinations of information about the distress.

Processor 618 also may be configured to take appropriate action in response to instructions 626 received via a satellite and satellite communications transceiver 614. For example, without limitation, processor 618 may be configured to generate and send position information 620, change a rate for generating and sending position information 620, or take other appropriate actions or various combinations of actions in response to instructions 626 received via satellite communications transceiver 614.

Electronics for tracking device 600 may include power supply 646. Power supply 646 may be implemented in any appropriate manner to provide appropriate electrical power for operation of the various electronic components in tracking device 600 from electrical power provided to power supply 646 on power line 636. For example, without limitation, in the case where tracking device 600 is attached to aircraft 601 on outside 602 of aircraft 601, power line 636 may be connected to provide electrical power to power supply 646 from power source 638 inside 640 of aircraft 601. Power source 638 may comprise any appropriate source of electrical power for operation of tracking device 600.

Power line 636 may be implemented in any appropriate manner to provide electrical power from power source 638 to power supply 646 in tracking device 600. Various undesirable conditions on power line 636 may cause inconsistencies in power supply 646 or other electronics in tracking device 600. For example, without limitation, power line 636 may include circuit breaker 648. Circuit breaker 648 may be implemented in any known and appropriate manner to prevent undesirable conditions on power line 636 from reaching power supply 646 or other electronics in tracking device 600. For example, without limitation, circuit breaker 648 may be implemented in a known and appropriate manner to prevent excessive current, excessive voltage, excessive power, or any other undesirable condition or combination of undesirable conditions on power line 636 from reaching power supply 646 and other electronics for tracking device 600.

Electrical power for operation of tracking device 600 may include battery 649. Battery 649 may be contained in housing 604 along with the other electronic components of tracking device 600. Battery 649 may include any appropriate type and number of batteries for providing appropriate electrical power for operation of various electronic components in tracking device 600. Power for operation of tracking device 600 may be provided by battery 649 as an alternative or in addition to providing power for operation of tracking device 600 from power source 638 via power line 636. For example, without limitation, when power for operation of tracking device 600 is available from both battery 649 and from power source 638 via power line 636, battery 649 may be used to provide back-up power for the operation of tracking device 600 when power on power line 636 is interrupted. For example, without limitation, when tracking device 600 is attached to aircraft 601 on outside 602 of aircraft 601, providing battery 649 for powering tracking device 600 may prevent accidental or intentional disabling of the operation of tracking device 600 from inside 640 of aircraft 601 by disrupting power for tracking device 600 that is provided on power line 636 from power source 638 located inside 640 of aircraft 601.

The different components illustrated for tracking device 600 are not meant to provide architectural limitations to the manner in which different embodiments may be implemented. The different illustrative embodiments may be implemented in a system including components in addition to, or in place of, those illustrated for tracking device 600. Other components shown in FIG. 6 can be varied from the illustrative examples shown.

For example, without limitation, processor 618 may also be configured to receive information identifying the position of aircraft 601 from other aircraft systems 650 on inside 640 of aircraft 601. Information provided by other aircraft systems 650 may be used for back-up, calibration, testing, or in comparison with the position of aircraft 601 identified using satellite navigation system receiver 610.

Electronics for tracking device 600 may be implemented in any appropriate manner using any appropriate hardware or hardware in combination with software. For example, without limitation, processor 618 may be configured to execute instructions for software that may be loaded or otherwise stored in storage 641. Processor 618 may be a number of processors, a multi-processor core, or some other type of processor, depending on the particular implementation. Further, processor 618 may be implemented using a number of heterogeneous processor systems in which a main processor is present with secondary processors on a single chip. As another illustrative example, processor 618 may be a symmetric multi-processor system containing multiple processors of the same type.

Storage 641 may include memory, persistent storage, or any other appropriate storage devices or various combinations of storage devices. Storage 641 may comprise any piece of hardware that is capable of storing information, such as, for example, without limitation, data, program code in functional form, and/or other suitable information either on a temporary basis and/or a permanent basis. Storage 641 may also be referred to as a computer-readable storage device in these examples. Storage 641, in these examples, may be, for example, a random access memory or any other suitable volatile or non-volatile storage device. Storage 641 may take various forms, depending on the particular implementation. For example, storage 641 may be implemented, in whole or in part, as part of processor 618. Alternatively, storage 641 may be implemented entirely separate from processor 618.

In any case, instructions for the operating system, applications, and/or programs may be located in storage 641, which is in communication with processor 618 in any appropriate manner. The processes of the different embodiments may be performed by processor 618 using computer-implemented instructions, which may be located in storage 641. These instructions may be referred to as program instructions, program code, computer usable program code, or computer-readable program code that may be read and executed by processor 618. The program code in the different embodiments may be embodied on different physical or computer-readable storage media.

In these examples, storage 641 may be a physical or tangible storage device used to store program code rather than a medium that propagates or transmits program code. In this case, storage 641 may be referred to as a computer-readable tangible storage device or a computer-readable physical storage device. In other words, storage 641 is embodied in a medium that can be touched by a person.

Alternatively, program code may be transferred to processor 618 using computer-readable signal media. Computer-readable signal media may be, for example, a propagated data signal containing program code. For example, computer-readable signal media may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples. In some illustrative embodiments, program code may be downloaded over a network to storage 641 from another device or data processing system through computer-readable signal media for use within processor 618.

The different embodiments may be implemented using any hardware device or system capable of running program code. As one example, electronics for tracking device 600 may include organic components integrated with inorganic components and/or may be comprised entirely of organic components, excluding a human being. For example, storage 641 may be comprised of an organic semiconductor.

In another illustrative example, processor 618 may take the form of a hardware unit that has circuits that are manufactured or configured for a particular use. This type of hardware may perform operations without needing program code to be loaded in storage 641 to be configured to perform the operations.

For example, when processor 618 takes the form of a hardware unit, processor 618 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include a programmable logic array, programmable array logic, a field programmable logic array, a field programmable gate array, and other suitable hardware devices. With this type of implementation, program code may be omitted, because the processes for the different embodiments are implemented in a hardware unit.

In still another illustrative example, processor 618 may be implemented using a combination of processors found in computers and hardware units. Processor 618 may have a number of hardware units and a number of processors that are configured to run program code. With this depicted example, some of the processes may be implemented in the number of hardware units, while other processes may be implemented in the number of processors.

Figure 7:
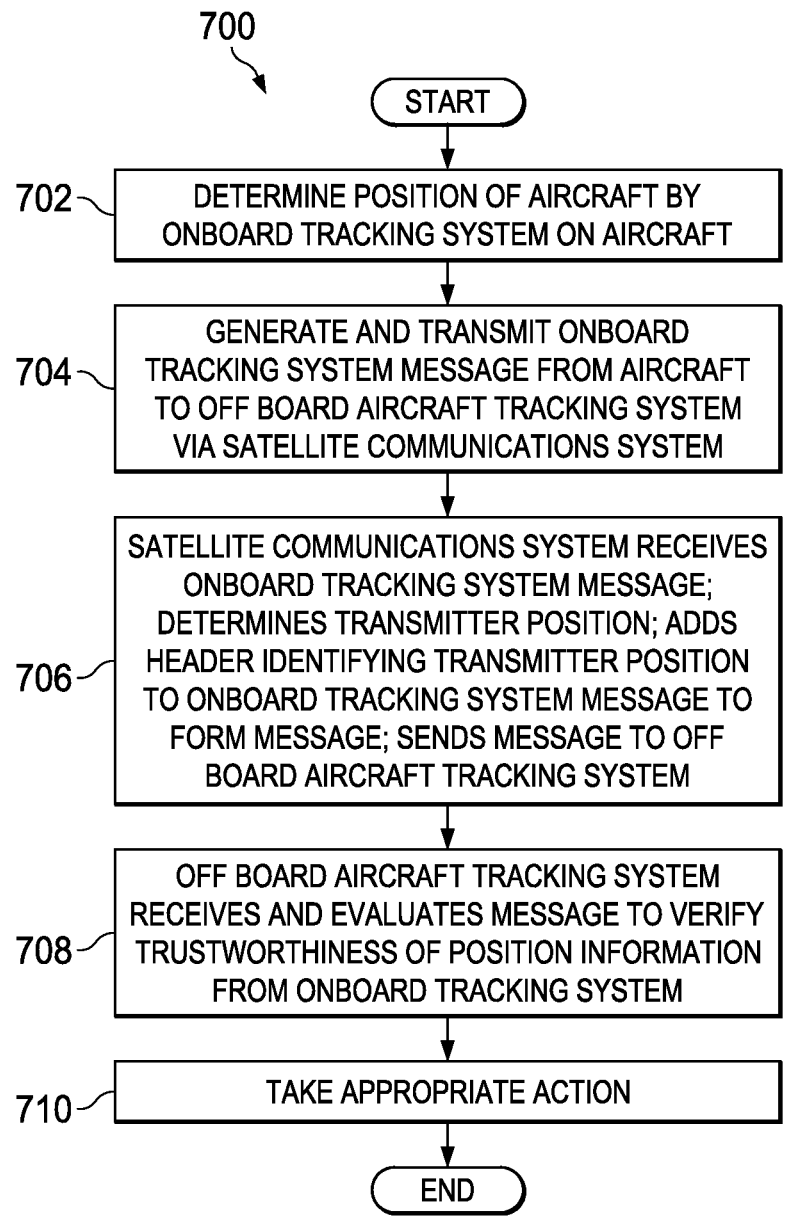
FIG. 7 is an illustration of a flowchart of a process of verifying the trustworthiness of position information transmitted from an aircraft via a communications satellite in accordance with an illustrative embodiment.

Turning to FIG. 7, an illustration of a flowchart of a process of verifying the trustworthiness of position information transmitted from an aircraft via a communications satellite is depicted in accordance with an illustrative embodiment. For example, without limitation, process 700 may be used to evaluate the trustworthiness of position information from aircraft 202 in aircraft operating environment 200 in FIG. 2.

Process 700 may begin with determining the position of the aircraft by an onboard tracking system on the aircraft (operation 702). An onboard tracking system message may be generated by the onboard tracking system on the aircraft and transmitted from the aircraft to an off board aircraft tracking system via a satellite communications system (operation 704). The satellite communications system receives the onboard tracking system message, determines the position of the transmitter of the onboard tracking system message, adds a header identifying the transmitter position to the onboard tracking system message received from the aircraft to form a message, and sends the message to the off board aircraft tracking system (operation 706).

The off board aircraft tracking system receives and evaluates the message from the satellite communications system to verify the trustworthiness of the position information from the onboard tracking system (operation 708). Appropriate action then may be taken (operation 710). For example, without limitation, operation 710 may include using the position information from the onboard tracking system to conduct a search and rescue operation when the position information from the onboard tracking system is determined to be trustworthy.

Figure 8:
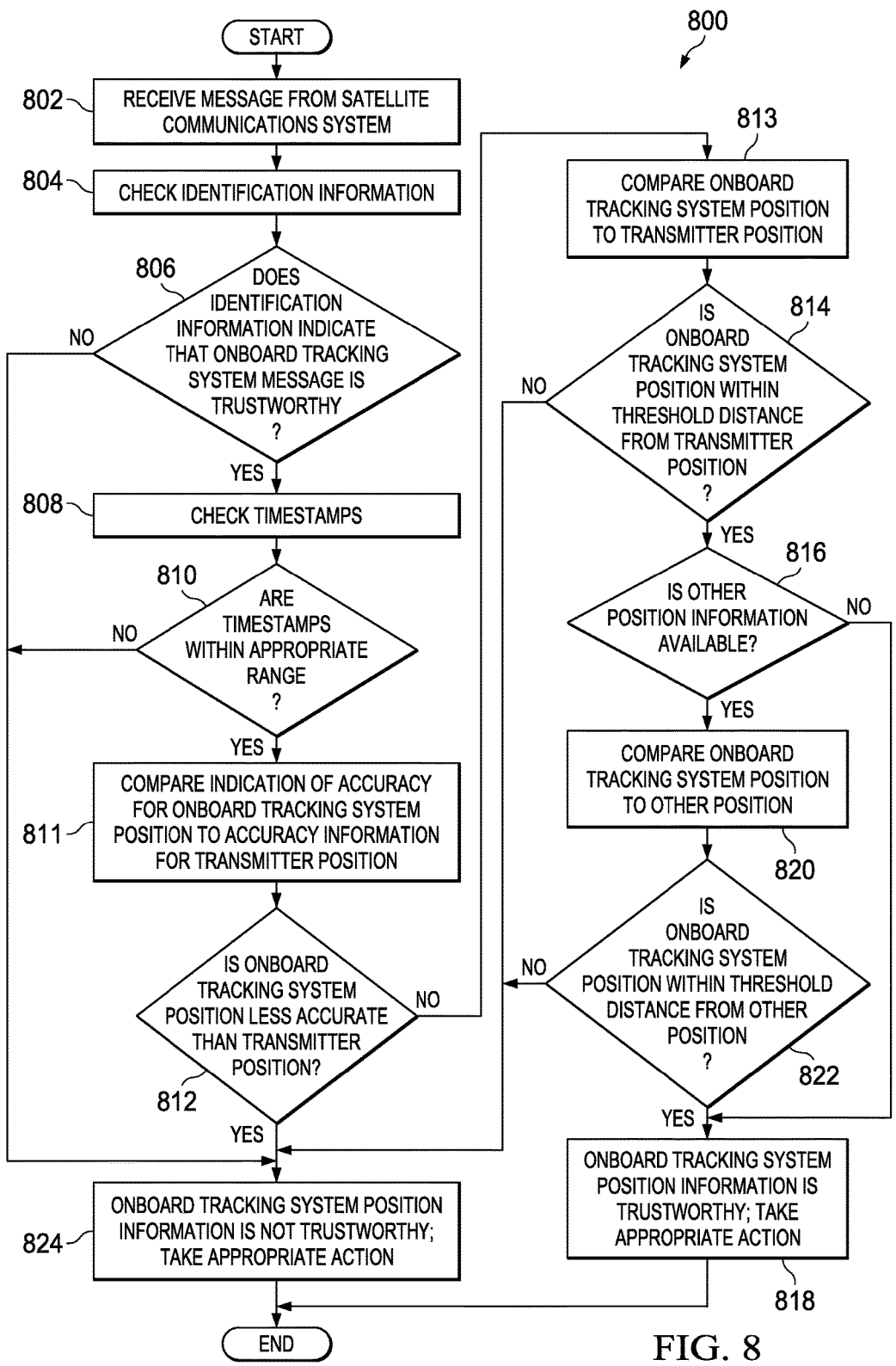
FIG. 8 is an illustration of a flowchart of a process of evaluating a message received from a satellite communications system to verify the trustworthiness of position information in the message from an onboard tracking system on an aircraft in accordance with an illustrative embodiment.

Turning to FIG. 8, an illustration of a flowchart of a process of evaluating a message received from a satellite communications system to verify the trustworthiness of position information in the message from an onboard tracking system on an aircraft is depicted in accordance with an illustrative embodiment. For example, without limitation, process 800 may be implemented using position information evaluator 500 in FIG. 5. Process 800 may be an example of one implementation of operations 708 and 710 in FIG. 7.

Process 800 may begin with receiving a message from a satellite communications system (operation 802). Identification information in the message may be checked (operation 804). It then may be determined whether the identification information indicates that the onboard tracking system message in the message received from the satellite communications system is trustworthy (operation 806).

In response to a determination at operation 806 that the identification information indicates that the onboard tracking system message in the message received from the satellite communications system is trustworthy, timestamps in the message may be checked (operation 808). The timestamps may be checked to determine whether the timestamps are within an appropriate range (operation 810).

In response to a determination at operation 810 that the timestamps are within an appropriate range, an indication of accuracy for the onboard tracking system position may be compared to accuracy information for the transmitter position (operation 811). The indication of accuracy for the onboard tracking system position may be compared to the accuracy for the transmitter position to determine whether the onboard tracking system position is less accurate than the transmitter position (operation 812).

In response to a determination at operation 812 that the onboard tracking system position is not less accurate than the transmitter position, the onboard tracking system position in the message may be compared to the transmitter position in the message (operation 813). It may be determined whether the onboard tracking system position is within a threshold distance from the transmitter position (operation 814).

In response to a determination at operation 814 that the onboard tracking system position is within a threshold distance from the transmitter position, it may be determined whether other position information is available (operation 816). In response to a determination that other position information is not available, it is determined that the onboard tracking system position information is trustworthy and appropriate action may be taken (operation 818), with the process terminating thereafter.

In response to a determination at operation 816 that there is other position information available, the onboard tracking system position may be compared to a position identified in the other position information (operation 820). It may be determined whether the onboard tracking system position is within a threshold distance from the position identified in the other position information (operation 822). In response to a determination that the onboard tracking system position is within a threshold distance from the position identified in the other position information, it is determined that the onboard tracking system position information is trustworthy and appropriate action may be taken (operation 818), with the process terminating thereafter.

In response to a determination at operation 806 that the identification information does not indicate that the onboard tracking system message is trustworthy, or a determination at operation 810 that the timestamps are not within an appropriate range, or a determination at operation 812 that the onboard tracking system position is less accurate than the transmitter position, or a determination at operation 814 that the onboard tracking system position is not within the threshold distance from the transmitter position, or a determination at operation 822 that the onboard tracking system position is not within a threshold distance from other position information, it is determined that the onboard tracking system position information is not trustworthy and appropriate action may be taken (operation 824), with the process terminating thereafter.

Figure 9:
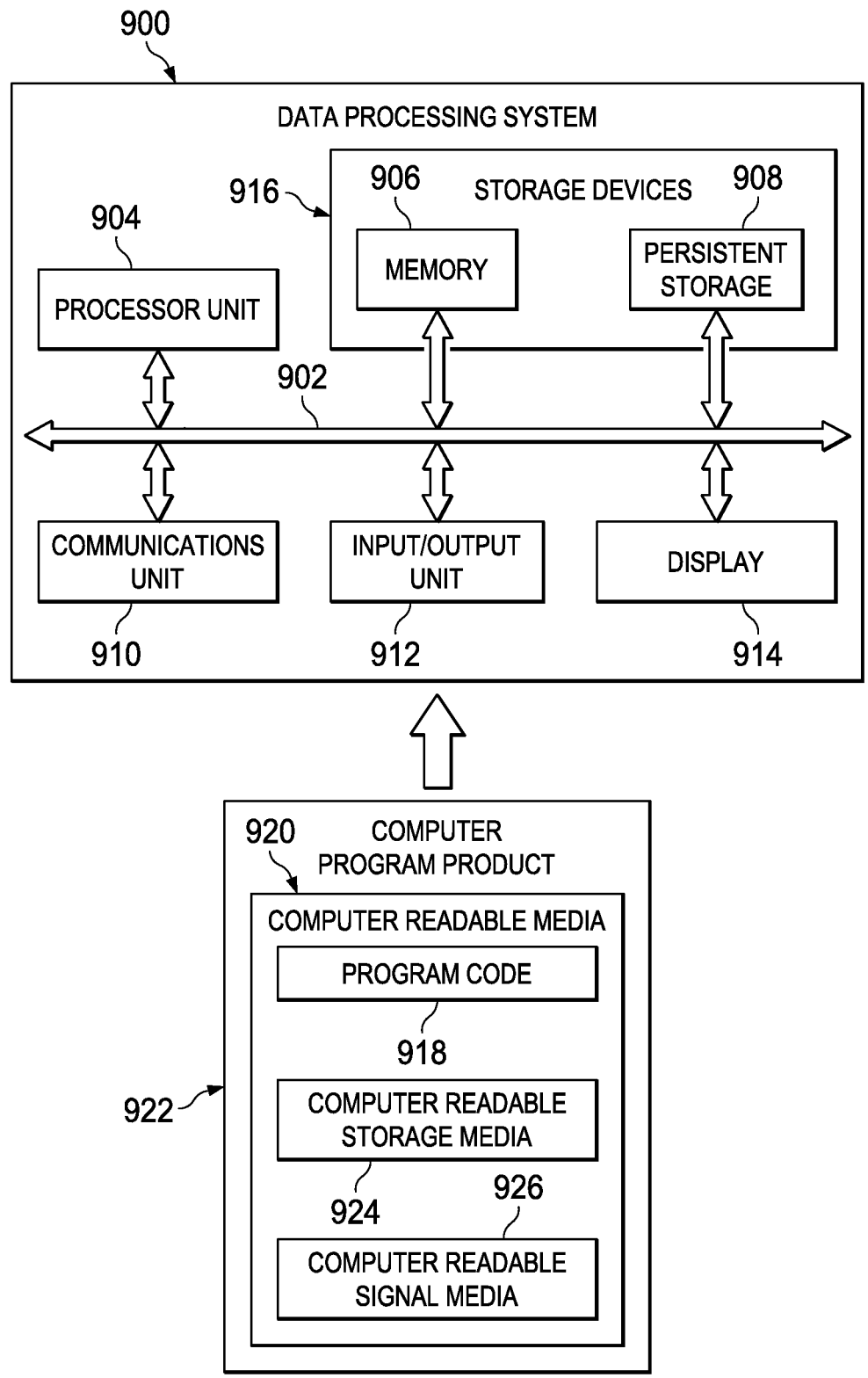
FIG. 9 is an illustration of a block diagram of a data processing system in accordance with an illustrative embodiment.

Turning to FIG. 9, an illustration of a block diagram of a data processing system on which various functions may be implemented is depicted in accordance with an illustrative embodiment. Data processing system 900 may be an example of one implementation of a data processing system on which functions of position information evaluator 500 in FIG. 5 is implemented. In this illustrative example, data processing system 900 includes communications fabric 902. Communications fabric 902 provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer-readable storage devices in these examples. Memory 906 may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer-usable program code, or computer-readable program code that may be read and executed by a processor in processor unit 904. The program code in the different embodiments may be embodied on different physical or computer-readable storage media 924, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may be computer-readable storage media 924 or computer-readable signal media 926.

Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

In these examples, computer-readable storage media 924 is a physical or tangible storage device used to store program code 918 rather than a medium that propagates or transmits program code 918. Computer-readable storage media 924 is also referred to as a computer-readable tangible storage device or a computer-readable physical storage device. In other words, computer-readable storage media 924 is a medium that can be touched by a person.

Alternatively, program code 918 may be transferred to data processing system 900 using computer-readable signal media 926. Computer-readable signal media 926 may be, for example, a propagated data signal containing program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer-readable signal media 926 for use within data processing system 900. For instance, program code stored in a computer-readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to, or in place of, those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components, excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or transmit and receive data. Communications unit 910 may be, for example, a modem or a network adapter, two network adapters, or some combination thereof. Further, a memory may be, for example, memory 906, or a cache, such as those found in an interface and memory controller hub that may be present in communications fabric 902.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description, and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of verifying trustworthiness of position information transmitted from an aircraft, comprising:
    receiving a message from a satellite communications system, the message comprising:
        an onboard tracking system message from an onboard tracking system on the aircraft comprising onboard tracking system position information indicating a first position for the aircraft determined by the onboard tracking system, and
        a header added to the onboard tracking system message by the satellite communications system comprising transmitter position information identifying a second position determined by the satellite communications system for transmission of the onboard tracking system message received by a communications satellite in the satellite communications system;
    comparing the first position from the onboard tracking system message to the second position from the header to determine whether the onboard tracking system position information is trustworthy, thereby enabling taking an action using the onboard tracking system position information with a reduced concern that the onboard tracking system position information is not trustworthy; and taking the action using the onboard tracking system position information from the onboard tracking system message in response to a determination that the onboard tracking system position information is trustworthy.

2. The method of claim 1, wherein the first position for the aircraft is determined by the onboard tracking system using navigation signals from a satellite navigation system.

3. The method of claim 1, wherein the communications satellite is an Iridium communications satellite and the satellite communications system is an Iridium satellite communications system.

4. The method of claim 1, wherein the onboard tracking system position information is determined to be trustworthy when the first position is within a threshold distance from the second position.

5. The method of claim 4, wherein the header added to the onboard tracking system message by the satellite communications system comprises accuracy information identifying an accuracy of the second position and further comprising using the accuracy information from the header to determine the threshold distance.

6. The method of claim 1 further comprising:
the onboard tracking system message comprises an indication of accuracy of the first position;
the header added to the onboard tracking system message by the satellite communications system comprises accuracy information identifying an accuracy of the second position; and
comparing the accuracy of the first position to the accuracy of the second position to determine whether the onboard tracking system position information is trustworthy.

7. The method of claim 1, wherein taking the action in response to the determination that the onboard tracking system position information is trustworthy comprises:
using the onboard tracking system position information to take the action by conducting a search and rescue operation.

8. The method of claim 1 further comprising:
determining a third position for the aircraft from other position information for the aircraft; and
comparing the first position from the onboard tracking system message to the third position determined from the other position information to determine whether the onboard tracking system position information is trustworthy.

9. The method of claim 8, wherein the other position information is selected from:
a filed flight plan for the aircraft created before the aircraft is in flight;
an active flight plan for the aircraft modified while the aircraft is in flight;
track information comprising a plurality of past positions of the aircraft;
automatic dependent surveillance broadcast position information from an automatic dependent surveillance broadcast from the aircraft; and
surveillance radar position information from a surveillance radar.

10. An apparatus, comprising:
a receiver configured to receive a message from a satellite communications system, the message comprising:
an onboard tracking system message from an onboard tracking system on an aircraft comprising onboard tracking system position information indicating a first position for the aircraft determined by the onboard tracking system, and
a header added to the onboard tracking system message by the satellite communications system comprising transmitter position information identifying a second position determined by the satellite communication system for a transmission of the onboard tracking system message received by a communications satellite in the satellite communications system; and
a comparator configured to compare the first position from the onboard tracking system message to the second position from the header to determine whether the onboard tracking system position information is trustworthy, thereby enabling taking an action using the onboard tracking system position information with a reduced concern that the onboard tracking system position information is not trustworthy.

11. The apparatus of claim 10, wherein the first position for the aircraft is determined by the onboard tracking system using navigation signals from a satellite navigation system.

12. The apparatus of claim 10, wherein the communications satellite is an Iridium communications satellite and the satellite communications system is an Iridium satellite communications system.

13. The apparatus of claim 10, wherein the comparator is configured to determine that the onboard tracking system position information is trustworthy when the first position is within a threshold distance from the second position.

14. The apparatus of claim 13, wherein the header added to the onboard tracking system message by the satellite communications system comprises accuracy information identifying an accuracy of the second position and further comprising a threshold distance calculator configured to use the accuracy information from the header to determine the threshold distance.

15. The apparatus of claim 10, wherein:
the onboard tracking system message comprises an indication of accuracy of the first position;
the header added to the onboard tracking system message by the satellite communications system comprises accuracy information identifying an accuracy of the second position; and
the comparator is configured to compare the accuracy of the first position to the accuracy of the second position to determine whether the onboard tracking system position information is trustworthy.

16. The apparatus of claim 10, wherein the comparator is configured to compare the first position from the onboard tracking system message to a third position determined from other position information to determine whether the onboard tracking system position information is trustworthy.

17. The apparatus of claim 16, wherein the other position information is selected from:
a filed flight plan for the aircraft created before the aircraft is in flight;
an active flight plan for the aircraft modified while the aircraft is in flight;
track information comprising a plurality of past positions of the aircraft;
automatic dependent surveillance broadcast position information from an automatic dependent surveillance broadcast from the aircraft; and
surveillance radar position information from a surveillance radar.

18. A method of verifying trustworthiness of position information transmitted from an aircraft, comprising:
receiving a message from a satellite communications system, the message comprising:
an onboard tracking system message from an onboard tracking system on the aircraft comprising onboard tracking system position information indicating a first position for the aircraft and an indication of accuracy of the first position determined by the onboard tracking system, and
a header added to the onboard tracking system message by the satellite communications system comprising transmitter position information identifying a second position determined by the satellite communication system for transmission of the onboard tracking system message received by a communications satellite in the satellite communications system and accuracy information identifying an accuracy of the second position;
comparing the accuracy of the first position from the onboard tracking system message to the accuracy of the second position from the header to determine whether the onboard tracking system position information is trustworthy, thereby enabling taking an action using the onboard tracking system position information with a reduced concern that the onboard tracking system position information is not trustworthy; and
taking the action using the onboard tracking system position information from the onboard tracking system message in response to a determination that the onboard tracking system position information is trustworthy.

19. The method of claim 18, wherein the onboard tracking system position information is determined to be trustworthy when the accuracy of the first position is not less than the accuracy of the second position.

20. The method of claim 18, wherein:
the first position for the aircraft and the accuracy of the first position is determined by the onboard tracking system using navigation signals from a satellite navigation system; and
the second position for the transmission and the accuracy of the second position is determined based on a position of the communications satellite and characteristics of the transmission between the onboard tracking system and the communications satellite.

\* \* \* \* \*